United States Patent
Rhee et al.

(10) Patent No.: US 7,556,760 B2
(45) Date of Patent: Jul. 7, 2009

(54) METHOD AND APPARATUS FOR MANUFACTURING OF BEADS FOR ARTIFICIAL PEARLS

(76) Inventors: Young Nam Rhee, 201, Noblehouse, 100-1, Banpo-dong, Seocho-Gu, Seoul (KR); Sang Min Rhee, #10, 430 Galleria Dr., San Jose, CA (US) 95134

(*) Notice: Subject to any disclaimer, the term of this patent is extended or adjusted under 35 U.S.C. 154(b) by 806 days.

(21) Appl. No.: 11/021,916

(22) Filed: Dec. 23, 2004

(65) Prior Publication Data

US 2005/0230866 A1 Oct. 20, 2005

Related U.S. Application Data

(63) Continuation-in-part of application No. 10/825,164, filed on Apr. 16, 2004, now abandoned.

(30) Foreign Application Priority Data

Sep. 2, 2004 (KR) ...................... 10-2004-0069869

(51) Int. Cl.
 *B29C 43/04* (2006.01)
(52) U.S. Cl. .......... 264/331.19; 264/334; 264/DIG. 55; 63/38
(58) Field of Classification Search ........................ None
 See application file for complete search history.

(56) References Cited

U.S. PATENT DOCUMENTS

| 1,868,851 | A | | 7/1932 | Rocker et al. |
| 1,969,477 | A | | 8/1934 | Rittman |
| 2,281,130 | A | * | 4/1942 | Woodruff ........................ 63/20 |
| 2,384,493 | A | | 9/1945 | Rolle |
| 3,342,686 | A | | 9/1967 | Jewel et al. |
| 4,389,365 | A | * | 6/1983 | Kudriavetz ................ 264/297.8 |
| 2002/0092323 | A1 | * | 7/2002 | Lieberman ..................... 63/38 |

\* cited by examiner

*Primary Examiner*—Mary Lynn F Theisen
(74) *Attorney, Agent, or Firm*—John K. Park; Park Law Firm

(57) ABSTRACT

In the method, an upper mould is fixed on an upper portion of a base body, and a lower mould is provided. When the primary molding is performed, the lower mould moves up at a different speed. The beads are drilled during the primary molding. After the primary molding, the lower mould moves down slightly. Gases generated while a material for the beads is cured are discharged, and the lower mould moves up to secondarily mold the beads. The lower mould is positioned on a pin plate fixed to a piston shaft of a cylinder. Semi-circular recesses of the lower mould are provided with pin holes. While pins fitted into the pin plate enters into and exits from the pin holes, the beads are drilled. The pin plate moves down by descent of the lifting plate, and thus the pins escape from the molded beads.

6 Claims, 8 Drawing Sheets

METHOD AND APPARATUS FOR MANUFACTURING OF BEADS FOR ARTIFICIAL PEARLS

CROSS-REFERENCE TO RELATED APPLICATIONS

This application claims benefit under 35 U.S.C. § 119 from Korean Patent Application No. 2004-0069869, filed on Sep. 2, 2004, the entire content of which is incorporated herein by reference. Also, this application is a continuation-in-part of U.S. patent application Ser. No. 10/825,164, filed Apr. 16, 2004 now abandoned.

BACKGROUND OF THE INVENTION

1. Field of the Invention

The present invention relates to a method and apparatus for manufacturing beads for artificial pearls used for various personal ornaments (e.g., necklaces, rings, bracelets).

2. Description of the Related Art

Such artificial pearls are produced from beads formed of a synthetic resin that is relatively inexpensive and capable of being mass-produced, which are used for various personal ornaments by applying a pearl solution having a color similar to a natural pearl to beads in every shape and form.

As primary materials of the artificial pearls, various kinds of synthetic resins may be used. Among them, a urea resin is most used.

The urea resin by nature has easy formability and relatively easy polishing process as the bead in view of hardness, weight, thermosetting capability, etc., thus being very widely used as the artificial pearl bead.

For a conventional method and apparatus for manufacturing artificial pearl beads, in the case of beads taking a circular shape when being seen in cross section (alternatively, an oval, semi-circular, triangular or quadrilateral shape), upper and lower moulds having semi-circular grooves are heated at a preset temperature. A powdered urea resin is poured into the semi-circular grooves of the lower mould, and then the upper mould is lowered to come into close contact with the lower mould. Subsequently, the urea resin is cured in the semi-circular grooves by heat from the upper and lower moulds, so that the circular beads are molded. In the case of perforated beads with a through-hole, a drilling pin for making the through-hole is provided in the center of each of the semi-circular grooves of the upper or lower mould. Thus, the beads are drilled while being molded. In the case of solid beads without a through-hole, the upper and lower moulds are provided only with the semi-circular grooves.

This conventional method and apparatus for manufacturing artificial pearl beads makes use of pressure, which has many problems.

These problems are as follows:

1) The beads are molded by pouring the urea resin into the semi-circular grooves of the fixed lower mould, and then by lowering the movable upper mould. Hence, an air pressure generated from the upper mould moving down at a constant speed has influence on the powered urea resin, so that the powered urea resin are scattered. In order to prevent this phenomenon, when the upper mould moves down at a slow speed, productivity drops remarkably.

2) The beads are produced only by primary moulding, so that there is a high possibility of air or gas generating bubbles in the bead. Furthermore, even a surface of the bead is provided with such bubbles or cracks. Accordingly, the bead undergoes deterioration in the value of commodities.

3) It is the most important problem that harmful gases generated when the urea resin are cured by hot heat are not properly discharged, thus being responsible for generation of the bubbles. Thereby, even the finished bead contains such harmful gases.

When artificial pearls finished from the beads containing these harmful gases are used as personal ornaments, the harmful gases leak out throughout a long period. As a result, various skin diseases such as a rash and an itching are generated.

For this reason, advanced nations impose intense restrictions on a permissible content of the harmful gases which the synthetic resin bead for the artificial pearl contains.

4) In the case of the beads with a through-hole, it is difficult to manufacture the mould because the drilling pin is formed in the semi-circular groove in which the bead is molded. In addition, it is very hard to separate the molded beads from the mould.

SUMMARY OF THE INVENTION

Therefore, the present invention has been made in view of the above-mentioned problems. The present invention is directed to provide a method and apparatus for manufacturing beads for artificial pearls, in which an ascent speed of a lower mould is automatically maintained to be constant using a cylinder driving means for moving up and down a lower mould for molding beads with holes by means of air or hydraulic pressure, and the beads are molded by primary and secondary moldings, and immediately after primary molding, gases generated from the primarily molded beads are sufficiently discharged and removed, and then the secondary molding causes a content of the harmful gases containing the beads to be greatly reduced and air bubbles generated from the beads to be reduced, thereby being capable of obtaining a high quality of artificial pearls.

Further, it is objective of the present invention to allow beads to be enhanced in productivity and quality, by directly drilling semi-circular recesses provided to a lower mould in the case of beads with holes, and by allowing pins, which are provided under the lower mould and fitted into pin plate moving up and down, to enter and exit into/from pin holes, thus clearly molding the holes of the beads.

Figure 2:
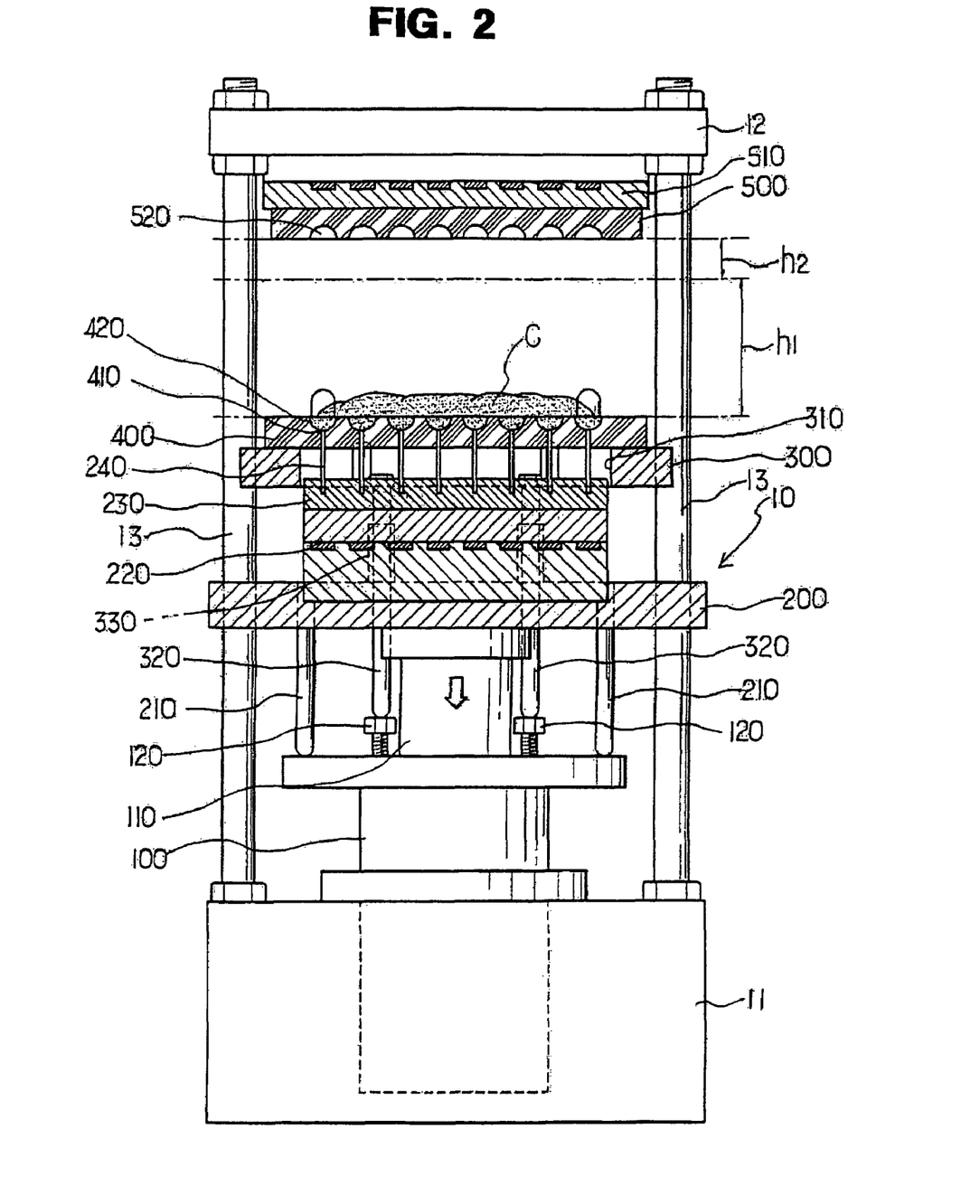
FIG. 2 is a cross-sectional view showing an apparatus used in a method for manufacturing beads for artificial pearls according to the present invention, in which a lower mould for molding the beads moves down to prepare molding of the beads.
Figure 3:
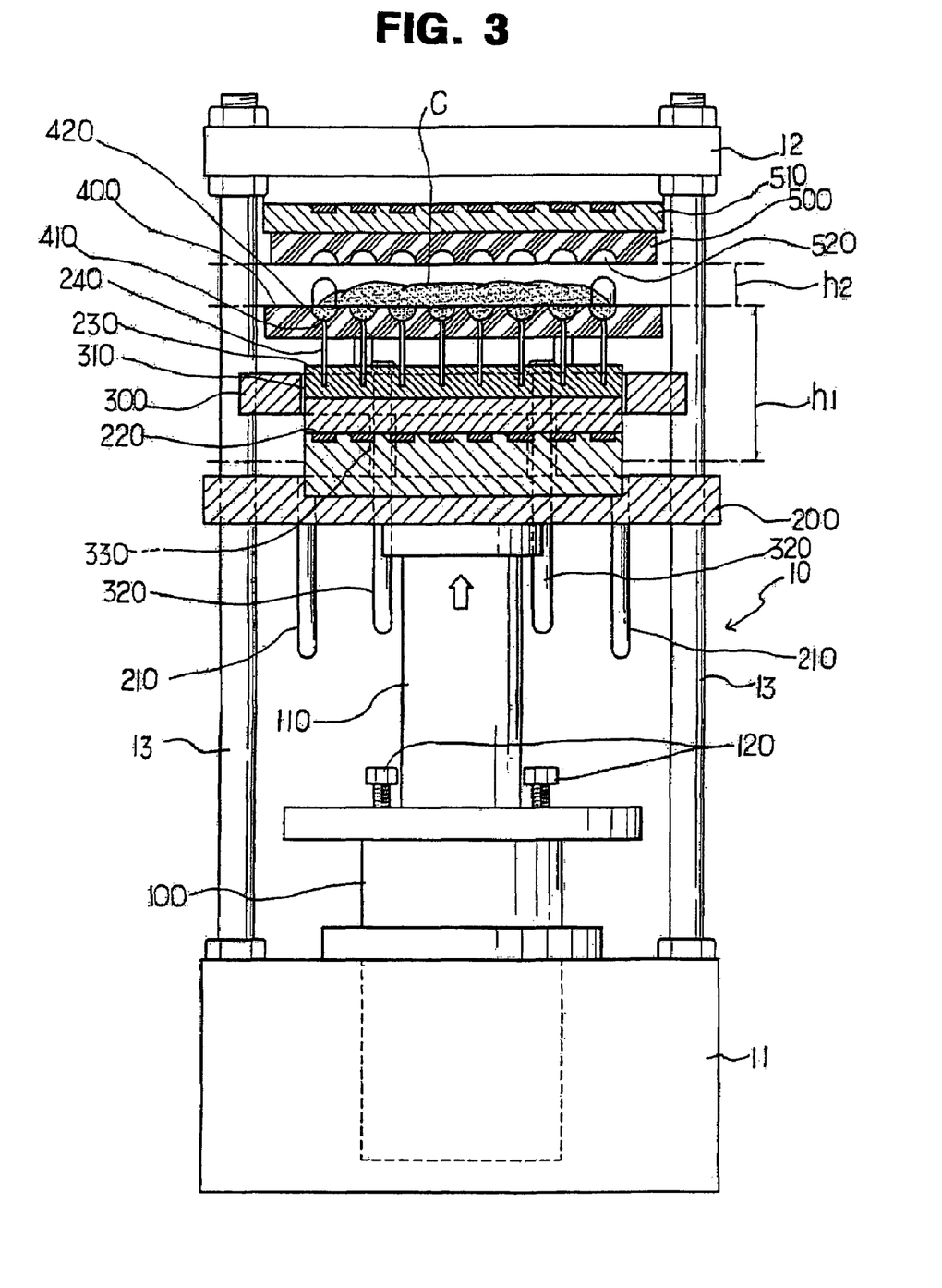
FIG. 3 is a cross-sectional view showing an apparatus used in a method for manufacturing beads for artificial pearls according to the present invention, in which a lower mould for molding the beads moves down primarily.
Figure 4:
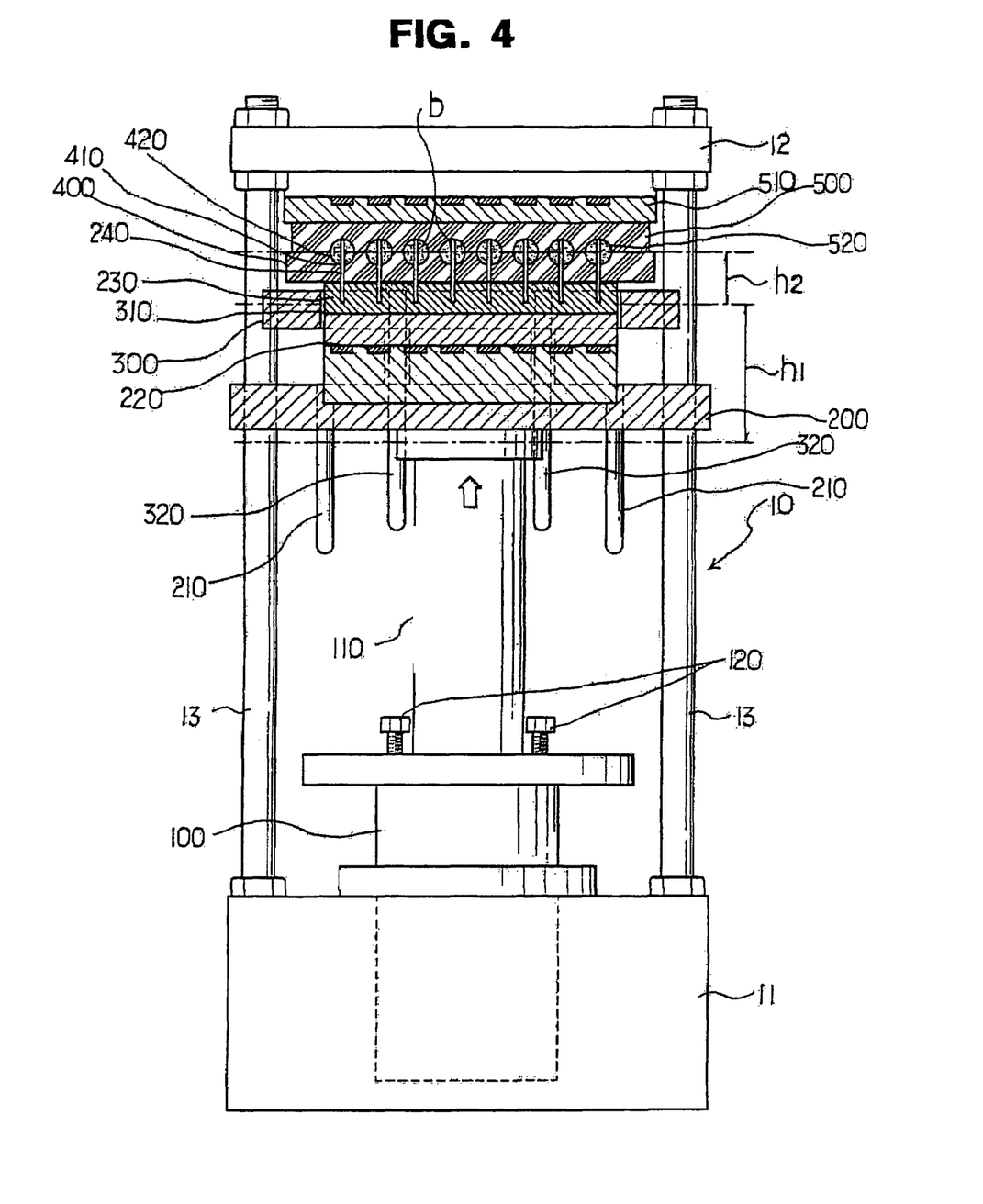
FIG. 4 is a cross-sectional view showing an apparatus used in a method for manufacturing beads for artificial pearls according to the present invention, in which the beads are primarily molded.
Figure 5:
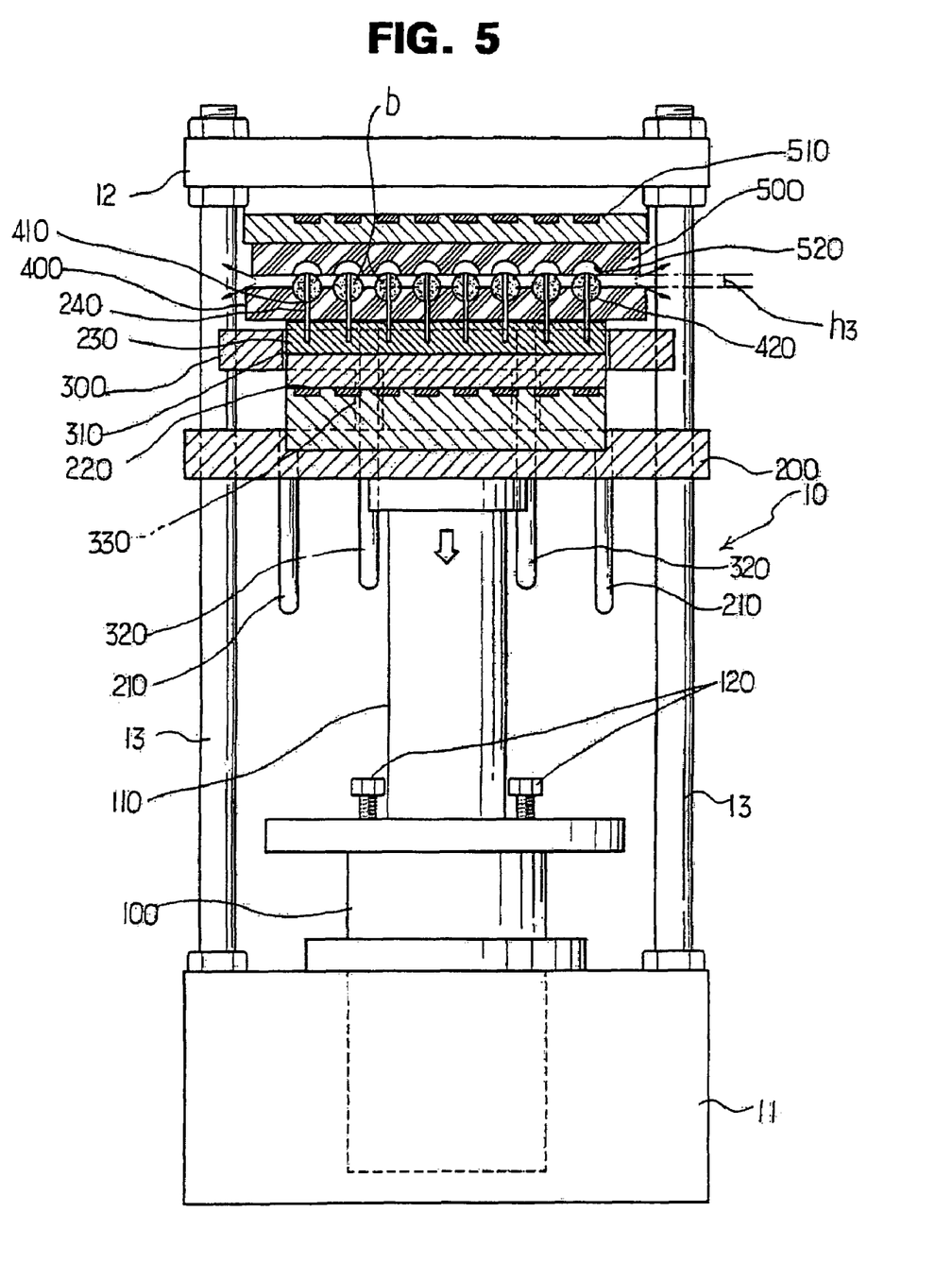
FIG. 5 is a cross-sectional view showing a state of moving down a lower mould by a predetermined distance in order to discharge harmful gases generated from primarily molded beads.
Figure 6:
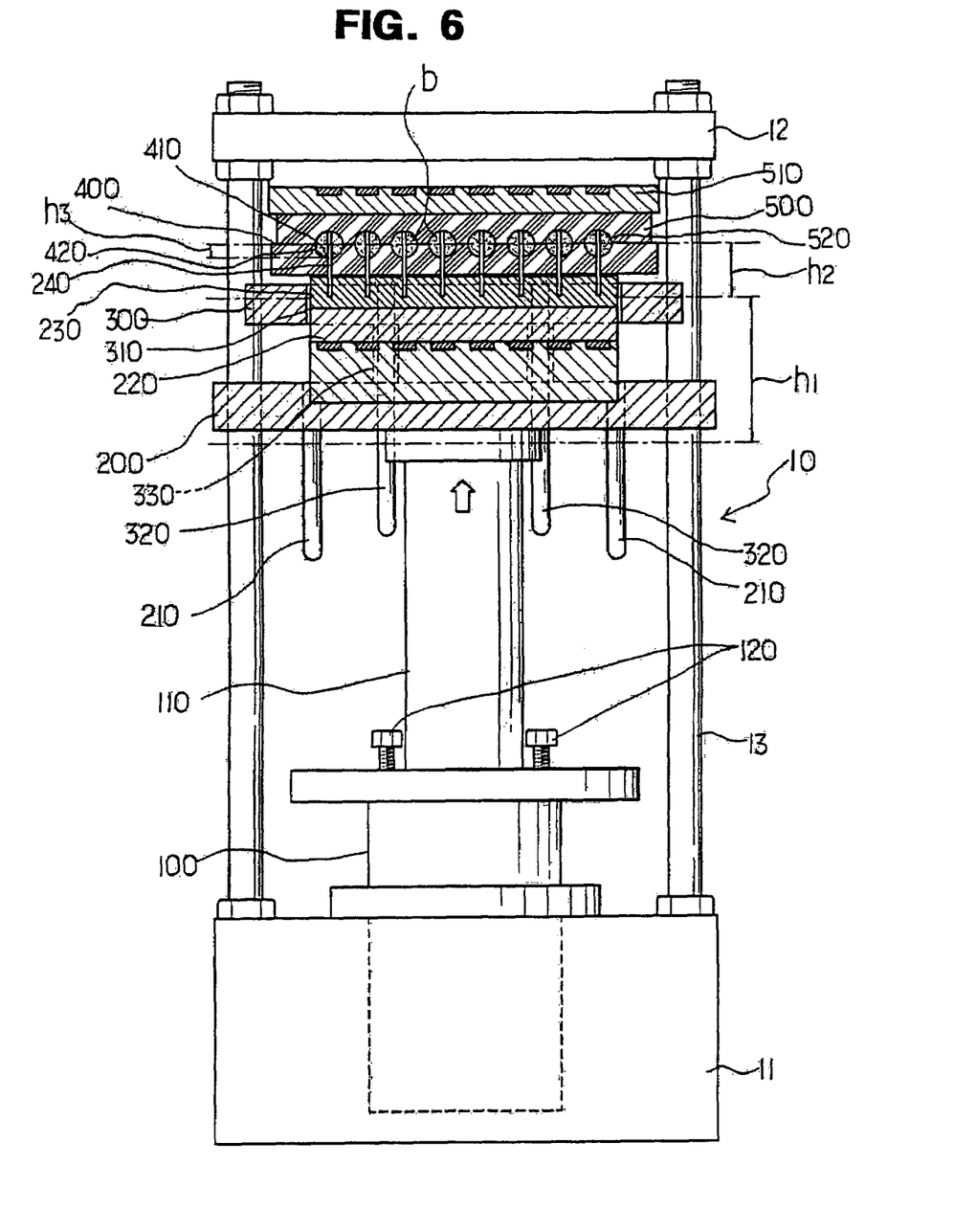
FIG. 6 is a cross-sectional view showing a state of discharging gases from primarily molded beads and then moving up a lower mould to secondarily mold the beads.
Figure 7:
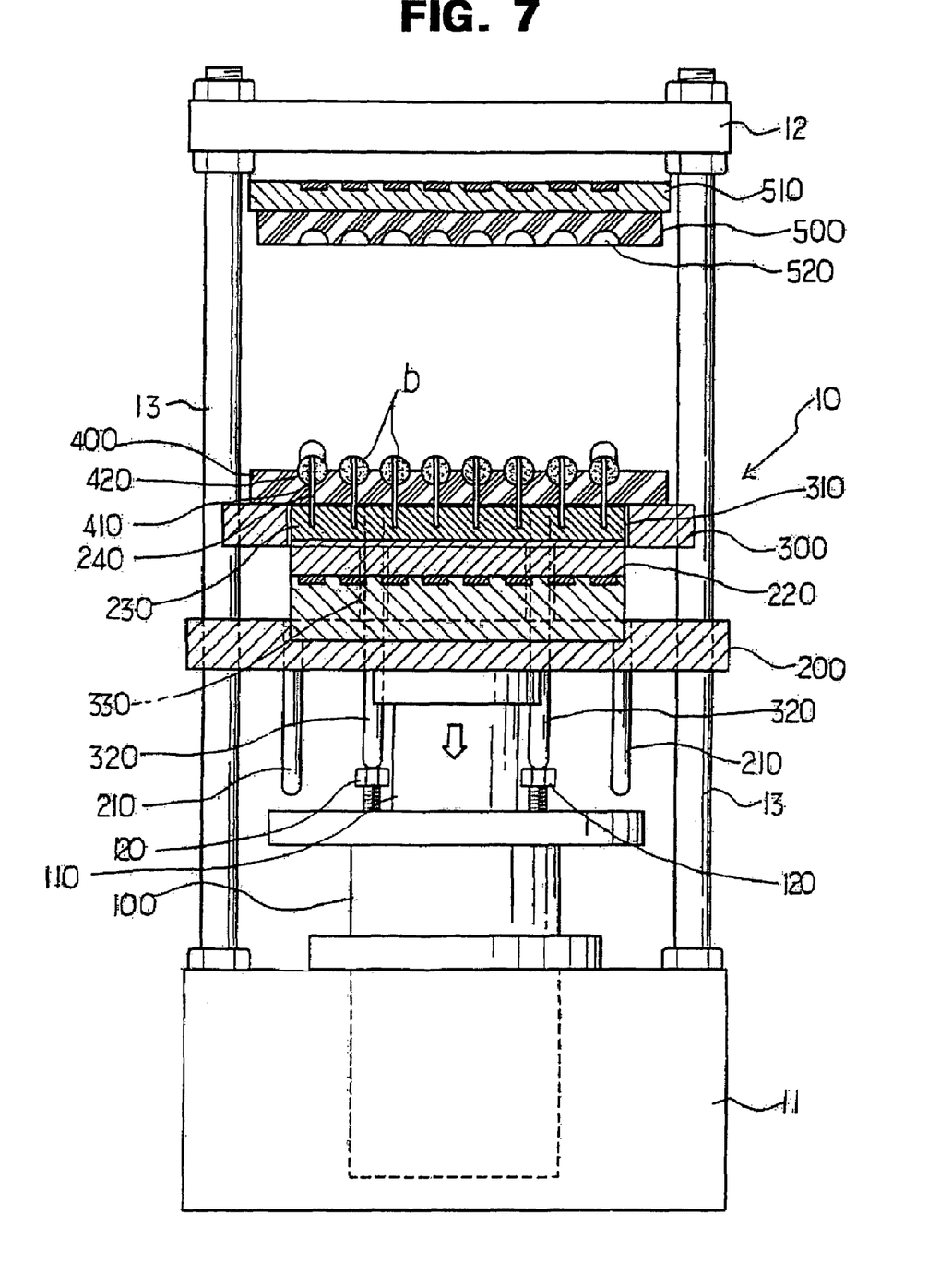
FIG. 7 is a cross-sectional view showing a state where a lower mould moves down in order to recollect completely molded beads and support rods of an intermediate plate comes into contact with height adjusting bolts.
Figure 8:
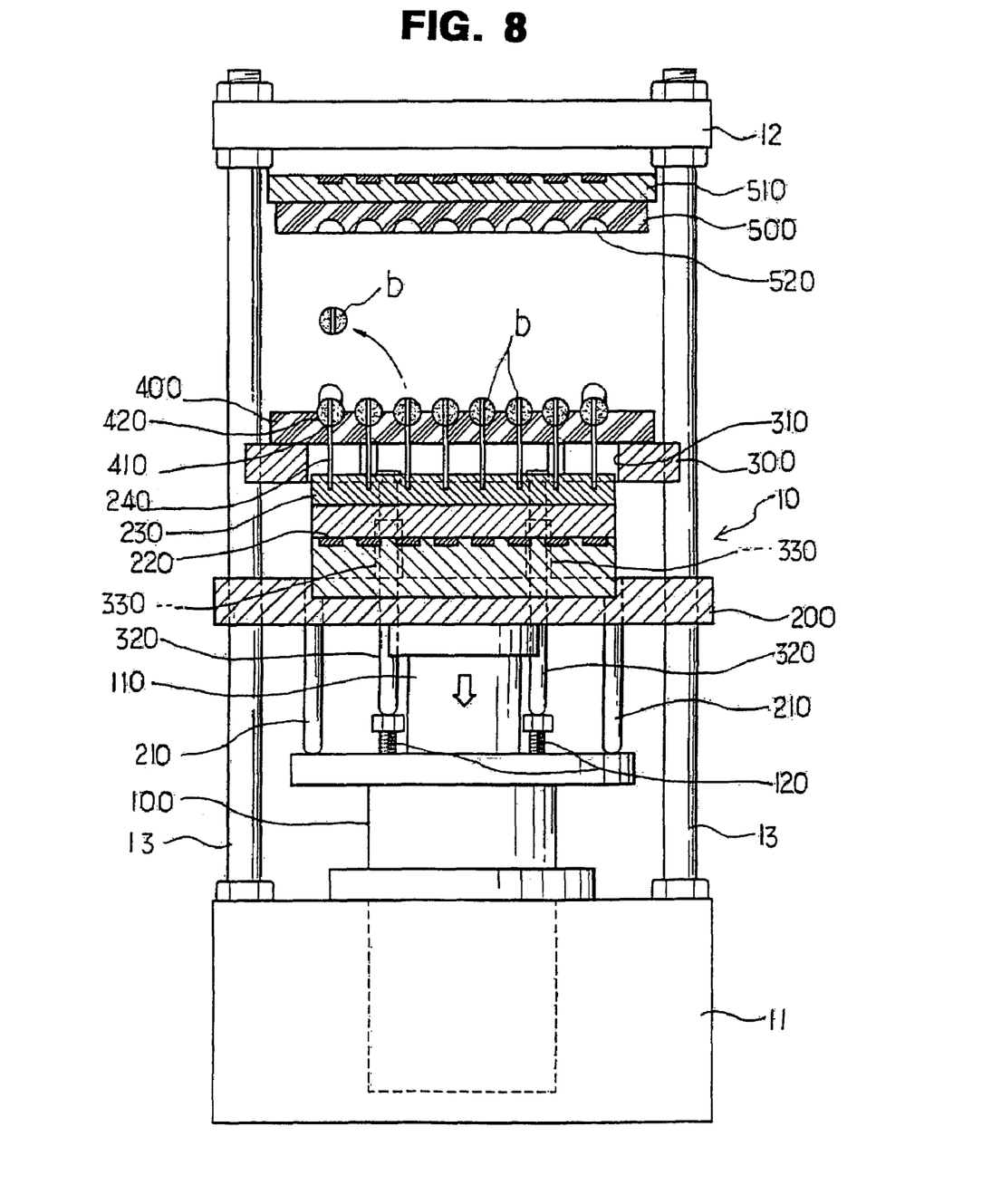
FIG. 8 is a cross-sectional view showing a state where a lower mould moves down completely and pins of a pin plate escape from molded beads.

In order to accomplish the objectives, there is provided a method for manufacturing beads for artificial pearls, comprising: a first step of fixing a fixed mould having semi-circular bead molding recesses on an upper portion of a base body, pouring a predetermined amount of urea resin powder (c) into a lower mould moving up and down by a piston shaft of an air cylinder and installed on a lower portion of the fixed mould as in FIG. 2, and moving up the lower mould at a fast speed as fast as a primary ascent interval by means of the piston shaft of the air cylinder, wherein the lower mould moves up with pins of a pin plate fitted only into pin holes of semi-circular recesses; a second step of the lower mould having moved up as fast as the primary ascent interval (h1) being greatly reduced in ascent speed at a position of neighboring to the upper mould, gradually moving up in a secondary ascent interval to come into contact with the upper mould and doing no longer move up in support on the upper mould, curing the urea resin powder (c) piled on the lower mould by heat of heating heaters installed on the upper and lower moulds, molding the urea resin powder into circular beads in the semi-circular recesses formed on the upper and lower moulds, simultaneously pushing the pins fitted into the pin holes into each center of the semi-circular recesses formed on the upper and lower moulds when the ascended piston shaft pushes up the pin plate, and drilling the primarily molded beads (b); a third step of slightly moving down the ascended piston shaft as in FIG. 5 when the primary bead molding is completed to generate a gas discharge interval (h3) between the upper and lower moulds, and discharging outside harmful gases generated from a urea resin through the gas discharge interval (h3) during the primary molding of the beads (b); a fourth step of moving up again the piston shaft which have moved down by the gas discharge interval (h3), and bringing the upper and lower moulds into close contact as in FIG. 4 to perform secondary molding of the primarily molded beads (b); a fifth step of moving down the ascended piston shaft as in FIG. 6 when the secondary molding is completed, the molded beads (b) are seated in the recesses of the lower mould with the pins fitted, the lower mould moves down in support on the pin plate and (see FIGS. 7 and 8), when lower ends of intermediate plate supporting rods fixed to an intermediate plate reach upper ends of height adjusting bolts and the intermediate plate stops to move down by the intermediate plate supporting rods, together with a lifting guide plate and the pin plate by the lasting descent of the piston shaft, the descended lower mould strikes the stopped intermediate plate not to move down any more, the pin plate continues to move down along the lifting guide plate, the pins fitted into the molded beads escape, when the lifting guide plate supporting rods fixed to the lifting guide plate reach an upper surface of a flange of the air cylinder at a time point when the pins completely escape from the beads, stopping to move down the lifting guide plate and the pin plate; and a sixth step of recollecting beads seated in the semi-circular recesses of the lower mould when the pins escape.

In the present invention, the ascent speed of the lower mould preferably is between about 10 and 30 cm per second up to an interval (h1) during the primary molding. Productivity is lowered when the ascent speed of the lower mould is slower than 10 cm per second. Powered urea resin stacked on the lower mould may be scattered when the ascent speed of the lower mould is faster than 30 cm per second.

the ascent speed of the lower mould preferably is, preferably, less than about 10 cm per second at a secondary ascent interval (h2). When being faster than 10 cm per second, the powered urea resin may be scattered or be not uniformly stretched because of air pressure generated between the lower and upper moulds.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

Hereinafter, a detailed description will be made about a configuration of an apparatus for manufacturing artificial pearl beads according to an exemplary embodiment of the invention with reference to the accompanying drawings.

A base body 10 is provided with guide posts 13 fixedly connecting corners of a lower base 11 and an upper base 12. A cylinder 100 has a piston shaft 110 installed in a middle of the lower base 11 and exposed outside, and is provided with height adjusting bolts 120. A lifting guide plate 200 is fixed to the piston shaft 110 of the cylinder 100 and moves up and down with the guide posts 13 inserted therein. A plurality of lifting guide plate supporting rods 210 are fixedly installed at several places under the lifting guide plate 200. At least one lower mould heating panel 220 is fixed to the lifting guide plate 220. A pin plate 230 is fixedly positioned on the lower mould heating panel 220 and is provided with a plurality of bead drilling pins 240. An intermediate plate 300 is provided with a gate 310 allowing of entrance and exit of the pin plate 230, a plurality of intermediate plate supporting rods 320 fixed at several places on a bottom surface thereof, and a spacing pipe 330 adjusting an interval between the intermediate plate and the lifting guide plate with the intermediate plate supporting rods inserted. A lower mould 400 is provided with a plurality of pin holes 410 into which the bead drilling pins 240 of the pin plate 230 are inserted and a plurality of semi-circular lower mould bead molding recesses 420 communicating with the plurality of pin holes 410. An upper mould 500 is fixed to an upper mould heating panel 510 installed on the upper base 12 of the base body 10 and is provided with a plurality of semi-circular upper mould bead molding recesses 520.

The cylinder 100 is driven by air or hydraulic pressure. Lifting distance and speed of the piston 110 are adjusted by a computer program or by manipulating a manual valve.

In the manufacturing method and apparatus of the present invention, the lower mould 400 is adapted to move up and down, it is because it is convenient to pour a powdered material for beads onto the flat lower mould 400 and because it is possible to prevent the bead material from being scattered when the lower mould moves up.

Hereinafter, effects of the manufacturing method and apparatus of the present invention will be described.

Figure 1:
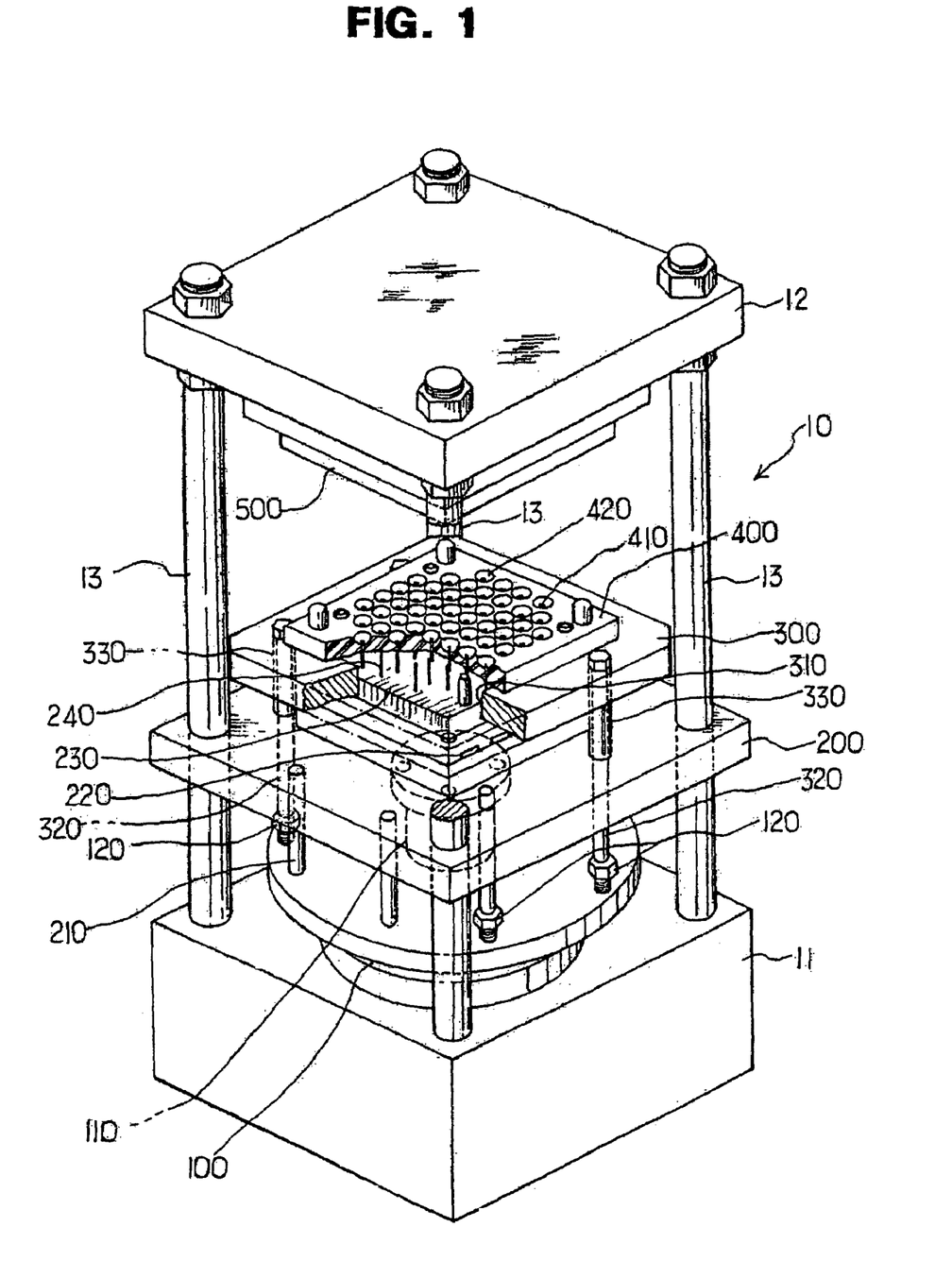
FIG. 1 is a perspective view showing an apparatus used in a method for manufacturing beads for artificial pearls according to the present invention, in which the apparatus is partially broken.

As in FIGS. 1 and 2, in the state where the piston shaft 110 moves down and thereby the lower mould 400 moves down, a proper amount of urea resin powder c is poured onto a flat upper surface of the lower mould 400 (see FIG. 2).

The amount of the urea resin powder c is determined according to a volume of the semi-circular bead molding recesses 520 and 420, which are provided to the upper and lower mould 500 and 400, respectively. The upper and lower mould 500 and 400 are mounted with the heating panels 510 and 220, so that the urea resin is cured by heat while the beads are molded.

The pins 240 fixed to the pin plate 230 are closely fitted into the pin holes 410 of the lower mould 400. Therefore, the lower mould is supported by the pins, and only a forced force causes the pins to escape from the pin holes.

Accordingly, when the pins escape from the molded beads as in FIG. 2, a predetermined interval is generated between the pin plate and the lower mould. Even in this state, the pins 240 are closely fitted into the pin holes 410 of the lower mould. Thus, the lower mould can move up and down with the interval kept to be constant with respect to the pin plate.

In the case of the lower mould, primary ascent movement is done by primary ascent interval h1, and preferably an ascent speed is between about 10 and 30 cm per second. However, the urea resin is not scattered even at the ascent speed between about 30 and 50 cm per second.

After the primary ascent movement, an upper surface of the lower mould reaches a start point of a secondary ascent interval h2. At this point, the ascent speed is lowered less than 10 cm per second. Alternately, the ascent speed may be between about 10 and 15 cm per second.

When the lower mould 400 moves up to come into contact with the upper mould 500, the urea resin is inserted into the semi-circular bead molding recesses 520 and 420 of the upper and lower moulds. Then, the urea resin is cured to primarily mold the beads. Next, the pin plate 230 moves down to push up the pins 240 by the interval escaping from the semi-circular bead molding recesses 420 of the lower mould 400. Thereby, the pins enter into the semi-circular bead molding recesses of the lower and upper moulds, so that the primarily molded beads are drilled.

A primary molding time of the beads is determined according to standard of the beads and temperature of the moulds, but preferably determined between about 3 and 5 seconds when the beads have a diameter of about 1 cm.

When the primary molding of the beads is completed, harmful gases generated from the urea resin are discharged. In this process, among the upper and lower moulds coming into contact with each other, the lower mould 400 moves down by a gas discharge interval h3 as the piston shaft moves down. The harmful gases are discharged through the gas discharge interval h3. In this case, the gas discharge interval h3 is preferably between about 5 and 10 mm. To this end, when the gas discharge interval h3 is narrow, the gas discharge time is lengthened. When the gas discharge interval h3 is wide, the gas discharge time is shortened.

When the gas discharge process is completed, the lower mould that has moved down moves up again. Thereby, the lower mould comes into contact with the upper mould, so that secondary molding of the beads is completed (see FIG. 6). The secondary molding is for eliminating air bubbles caused by gases and air contained in the primarily molded beads to thus enhance a density of the bead.

When the secondary molding of the beads is completed, the lifting guide plate 200, the intermediate plate 300 and the lower mould 400 move down along the piston shaft. At this time, the lower mould and the pin plate 230 continue to be in close contact with each other, and the pins 240 of the pin plate are in the state of passing through the molded beads.

Subsequent to this state, lower ends of the intermediate plate supporting rods 320 fixed under the intermediate plate 300 reach the height adjusting bolts 120, the intermediate plate does no longer move down. Further, both the pin plate fixed to the lifting guide plate 200 and the lower mould moves down along the lifting guide plate, but stops to move down in a state of resting on the intermediate plate without passing through the gate 310 of the stopped intermediate plate 300. Meanwhile, the pin plate passing through the gate 310 of the intermediate plate 300 moves down along the lifting guide plate 200, and thereby the lower mould stops to move down. Therefore, the pin plate moves down, and the pins escape from the beads to bottoms of the bead molding recesses of the lower mould. At this time, the lifting guide plate supporting rods 210 fixed under the lifting guide plate come into contact with an upper surface of the flange of the cylinder, so that the lifting guide plate and the pin plate do no longer move down, the beads from which the pins have escaped are collected from the lower mould (see FIG. 8).

The intermediate plate supporting rods 320, which are fixed under the intermediate plate 300, pass through the lifting guide plate. A spacing plate 340 is fitted into the intermediate plate supporting rods 320 between the lifting guide plate and the intermediate plate. Thus, when moving up or down, the interval between the lifting guide plate and the intermediate plate is maintained. The height adjusting bolts 120 installed to the cylinder flange adjust a height so that, when the pin plate 230 moves down, the pins 240 of the pin plate safely escape from the lower mould bead molding recesses 420. The height adjusting bolts 120 are adjusted according to a thickness of the lower mould and a size of the bead molding recess.

The beads manufactured by the method and apparatus are subjected to a surface polishing process and are painted on its surface with a pearl solution, thereby being finished as artificial pearls.

Further, it is possible to manufacture the beads without holes using the method and apparatus of the present invention. Thus, when the lower mould having semi-circular bead molding recesses without pin holes is fixed to the lower mould, it is possible to produce the beads without pin holes.

According to the present invention implemented by the method and apparatus, the molding process of the beads is carried out automatically, so that it is possible to mass-produce the beads at a high quality. Further, it is possible to sharply reduce a labor force needed to produce the beads. The beads produced by the primary and secondary moldings have a good quality, and the harmful gases generated from the fundamental material of the beads are removed automatically, so that it is possible to produce the nonpolluting beads.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for manufacturing beads for artificial pearls, comprising:

a first step of fixing a fixed mould having semi-circular bead molding recesses on an upper portion of a base body, pouring a predetermined amount of urea resin powder into a lower mould moving up and down by a piston shaft of an air cylinder and installed on a lower portion of the fixed mould, and moving up the lower mould at a fast speed as fast as a primary ascent interval by means of the piston shaft of the air cylinder, wherein the lower mould moves up with pins of a pin plate fitted only into pin holes of semi-circular recesses;

a second step of the lower mould having moved up as fast as the primary ascent interval being greatly reduced in ascent speed at a position of neighboring to the upper mould, gradually moving up in a secondary ascent interval to come into contact with the upper mould and doing no longer move up in support on the upper mould, curing the urea resin powder piled on the lower mould by heat of heating heaters installed on the upper and lower moulds, molding the urea resin powder into circular beads in the semi-circular recesses formed on the upper and lower moulds, simultaneously pushing the pins fitted into the pin holes into each center of the semi-circular recesses formed on the upper and lower moulds when the ascended piston shaft pushes up the pin plate, and drilling the primarily molded beads;

a third step of slightly moving down the ascended piston shaft when the primary bead molding is completed to generate a gas discharge interval between the upper and lower moulds, and discharging outside harmful gases generated from a urea resin through the gas discharge interval during the primary molding of the beads;

a fourth step of moving up again the piston shaft which have moved down by the gas discharge interval, and bringing the upper and lower moulds into close contact to perform secondary molding of the primarily molded beads;

a fifth step of moving down the ascended piston shaft when the secondary molding is completed, the molded beads are seated in the recesses of the lower mould with the pins fitted, the lower mould moves down in support on the pin plate and, when lower ends of intermediate plate supporting rods fixed to an intermediate plate reach upper ends of height adjusting bolts and the intermediate plate stops to move down by the intermediate plate supporting rods, together with a lifting guide plate and the pin plate by the lasting descent of the piston shaft, the descended lower mould strikes the stopped intermediate plate not to move down any more, the pin plate continues to move down along the lifting guide plate, the pins fitted into the molded beads escape, when the lifting guide plate supporting rods fixed to the lifting guide plate reach an upper surface of a flange of the air cylinder at a time point when the pins completely escape from the beads, stopping to move down the lifting guide plate and the pin plate; and a sixth step of collecting beads seated in the semi-circular recesses of the lower mould when the pins escape.

2. The method as claimed in claim 1, wherein the ascent speed of the lower mould is variably controlled.

3. The method as claimed in claim 1, wherein the ascent speed of the lower mould within the primary ascent interval is faster than that within the secondary ascent interval.

4. The method as claimed in claim 1, wherein the ascent speed of the lower mould is between about 10 and 30 cm per second within the primary ascent interval, and between about 5 and 10 cm per second within the secondary ascent interval.

5. The method as claimed in claim 1, wherein means for removing the gases generated from the primarily molded beads moves down the lower mould by the gas discharge interval.

6. The method as claimed in claim 1, wherein the gas discharge interval is between about 5 and 30 mm.

* * * * *